UNITED STATES PATENT OFFICE.

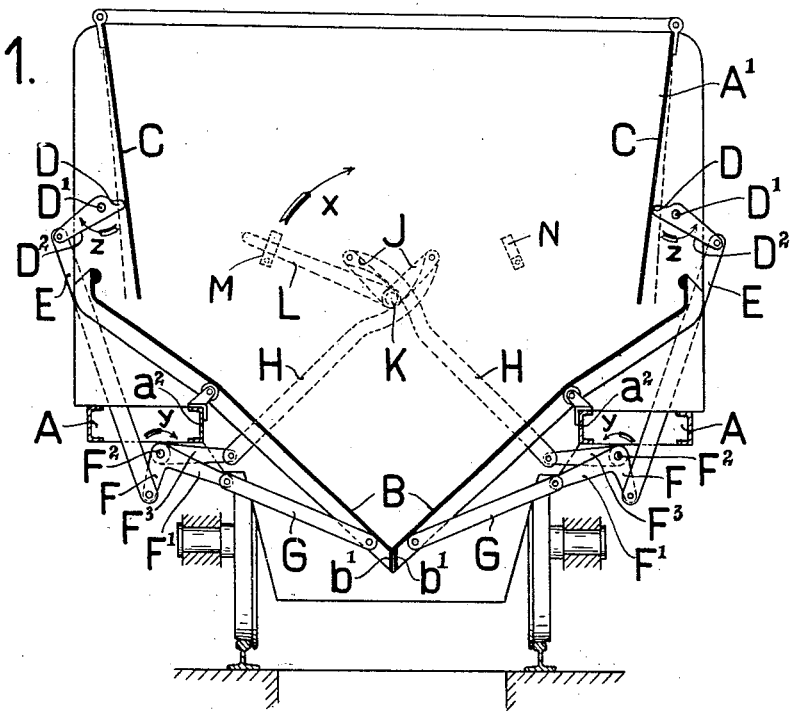
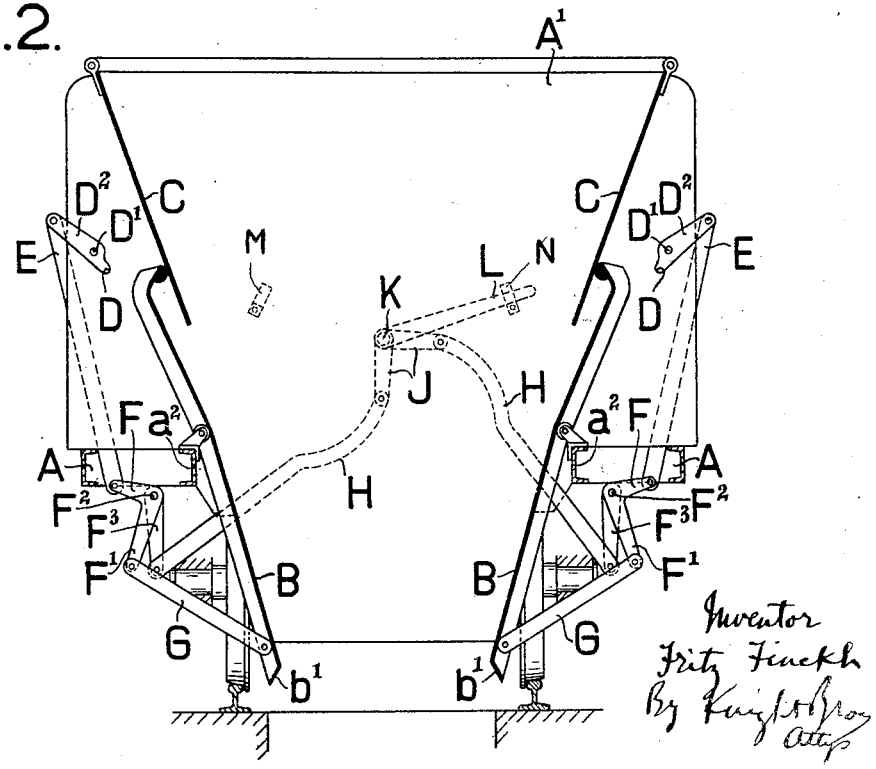

FRITZ FINCKH, OF ESSEN-ON-THE-RUHR, GERMANY, ASSIGNOR TO FRIED. KRUPP AKTIENGESELLSCHAFT, OF ESSEN-ON-THE-RUHR, GERMANY.

VEHICLE DISCHARGING FROM THE BOTTOM.

1,410,094.  Specification of Letters Patent.  Patented Mar. 21, 1922.

Application filed December 7, 1920. Serial No. 428,989.

*To all whom it may concern:*

Be it known that I, FRITZ FINCKH, residing at Essen-on-the-Ruhr, Germany, a citizen of the German Republic, have invented a certain new and useful Improvement in Vehicles Discharging from the Bottom, (for which I have filed an application in Germany September 12, 1919,) of which the following is a specification.

This invention relates to vehicles discharging from the bottom having two bottom doors opening automatically under the action of the weight of the load and having movable side walls which come into sliding contact with the bottom doors, on the discharging movement of the parts, one of said side walls at least being held, when in the loading position, by means of an abutment, at a distance from the corresponding bottom trap, so that on the discharging movement only, said sliding contact closed by force is established between the bottom door and the corresponding side wall. The object of the present invention is to so improve self-discharging vehicles of this kind that the walls of the vehicle, which are to be displaced by the bottom doors on the discharging operation, execute, at the beginning of this operation, an additional movement in order to loosen the load, which often tends to be jammed.

One embodiment of the subject matter of the invention is illustrated by way of example in the accompanying drawing in which—

Fig. 1 shows a section of the self-discharging vehicle ready to be loaded, and

Fig. 2 a similar section of the wagon after the discharging operation has been completed.

On the sills $a^2$ of the under frame A of the vehicle which has fixed end walls $A^1$, there are swingingly mounted the two bottom doors B. When in the loading position, these bottom doors are inclined towards the middle line of the vehicle and bear against each other with their lower edges $b^1$ in a hopper-like manner.

The side walls C of the vehicle are swingingly suspended at their upper edges from the end walls $A^1$ and bear, in the loading position of the parts, against movable abutments D rotatably mounted on side shafts $D^1$. The shafts $D^1$ in their turn, are mounted on the end walls $A^1$.

The abutments D are on levers $D^2$ which are connected to one arm F of bell-crank levers F $F^1$ through the intermediary of rods E. The other arms, $F^1$ of said bell-crank levers are fixed on a side shaft $F^2$ mounted on the frame A of the vehicle and are connected, by means of rods G, to the lower part of the corresponding bottom door B. The length of the rods G and of the lever arms $F^1$ are so chosen that in the loading position of the vehicle, the joints of these parts lie in a straight line, so that the systems of rods G $F^1$ assume a dead center position and then prevent the bottom doors B from being opened unintentionally. On each of the ends of the side shafts $F^2$ projecting beyond the end walls $A^1$ there is fixed a lever $F^3$ which is connected, by means of a rod H, to a lever J. The levers J are rigidly fixed on short shafts K mounted on the end walls $A^1$. Beside these levers J, the shafts K carry a hand lever L. The disposition of these parts is such that in the loading position of the vehicle (Fig. 1), the joints of the rods H and of the levers J lie in a straight line and, consequently, assume a dead center position. Furthermore, a device, such as two stationary spring locking clips M and N is provided on the end walls $A^1$ by means of which the hand lever L can be held in place or locked with respect to its end wall. By means of the abutments D the side walls C of the vehicle are held, when in the loading position (Fig. 1), in such a manner that a space exists between their lower edges and the upper edges of the bottom doors B. The abutments D are so formed that their faces abutting on the side walls assume their position nearest the middle line of the vehicle when the parts are in the loading position.

In order to prepare the discharging movement of the described parts, the hand lever L is freed by releasing it from the clip or lock M and then turned in the direction of the arrow $x$ (Fig. 1). In consequence of the described arrangement of the system K J H $F^3$ at the same time the side shafts $F^2$ turn in the direction of the arrows $y$ (Fig. 1). The rotation of the shafts $F^2$ is taken part in also by the bell-crank levers F $F^1$. On their rotation these latter draw with them the adjacent rods so that the rods G $F^1$ are swung out of their dead center position and the bottom traps then drop down under the action of the weight of the load. At the same time the rods E are shifted upwards by the lever arms F so that the abutments D execute a rotation in the direction of the arrows z (Fig. 1), and release the side walls C. Then, under the action of the lateral pressure of the load the side walls swing outwards and towards the upper edges of the bottom doors B so that the space between the side walls C increases and a loosening of the load lying between them is effected, at the same time the upper edges of the bottom doors make a movement directed to the middle line of the vehicle. On this movement they strike with a considerable force against the side walls which are, from this moment, in sliding contact closed by force, with the bottom doors and are swung by these doors so far inwardly that the parts assume the position shown in Fig. 2.

The shock produced when the bottom doors strike against the side walls and the construction of the loading space effects a loosening and a complete discharging of the load.

I claim:

1. A vehicle discharging from the bottom having bottom doors opening automatically under the action of the weight of the load, movable side walls, movable abutments adapted to establish a sliding contact between said side walls and said bottom doors on the discharging movement of the parts, means for transmitting the discharging movement of the bottom doors to the abutments of the corresponding side walls in order to enable said side walls to make an outward movement.

2. A vehicle discharging from the bottom having bottom doors opening automatically under the action of the weight of the load, movable side walls, movable abutments adapted to establish a sliding contact between said side walls and said bottom doors on the discharging movement of the parts, a system of rods connecting said abutments to the corresponding bottom doors so as to transmit the discharging movement of said bottom doors to the abutments of the corresponding side walls in order to enable said side walls to make an outward movement.

3. A vehicle discharging from the bottom having bottom doors opening automatically under the action of the weight of the load, a locking device adapted to carry said bottom doors in the loading position, movable side walls, movable abutments adapted to establish a sliding contact between said side walls and said bottom doors on the discharging movement of the parts, a system of rods connecting said abutments to the corresponding bottom doors so as to transmit the discharging movement of said bottom doors to the abutments of the corresponding side walls in order to enable said side walls to make an outward movement.

4. A vehicle discharging from the bottom having bottom doors opening automatically under the action of the weight of the load, a locking device adapted to carry said bottom doors in the loading position, movable side walls, movable abutments adapted to establish a sliding contact between said side walls and said bottom doors on the discharging movement of the parts, a system of rods connecting said abutments to the corresponding bottom doors so as to transmit the discharging movement of said bottom doors to the abutments of the corresponding side walls in order to enable said side walls to make an outward movement, said system of rods forming said locking device carrying the bottom doors in the loading position.

The foregoing specification signed at Essen, Germany, this 23rd day of July, 1920.

FRITZ FINCKH.

In presence of—
HANS GOTTSMANN,
JOHANN DECKERS.